(12) United States Patent
Dell et al.

(10) Patent No.: US 7,539,800 B2
(45) Date of Patent: *May 26, 2009

(54) SYSTEM, METHOD AND STORAGE MEDIUM FOR PROVIDING SEGMENT LEVEL SPARING

(75) Inventors: Timothy J. Dell, Colchester, VT (US); Frank D. Ferraiolo, New Windsor, NY (US); Kevin C. Gower, LaGrangeville, NY (US); Kevin W. Kark, Poughkeepsie, NY (US); Mark W. Kellogg, Henrietta, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,188

(22) Filed: Jul. 30, 2004

(65) Prior Publication Data

US 2006/0036827 A1    Feb. 16, 2006

(51) Int. Cl.
  *G06F 13/00*    (2006.01)
  *G06F 11/00*    (2006.01)
(52) U.S. Cl. .................. 710/100; 714/4; 714/43; 714/56
(58) Field of Classification Search ............... 714/43, 714/56, 710, 4; 710/316, 317, 100
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | |
| 4,028,675 A | 6/1977 | Frankenburg | 711/106 |
| 4,135,240 A | 1/1979 | Ritchie | |
| 4,150,428 A * | 4/1979 | Inrig et al. | 379/279 |
| 4,472,780 A | 9/1984 | Chenoweth et al. | |
| 4,475,194 A | 10/1984 | LaVallee et al. | |
| 4,486,739 A | 12/1984 | Franaszek et al. | |

(Continued)

FOREIGN PATENT DOCUMENTS

| | | |
|---|---|---|
| EP | 0229316 A2 | 7/1987 |
| EP | 0470734 A1 | 2/1992 |
| EP | 0899743 A2 * | 6/1998 |
| EP | 1429340 A2 | 6/2004 |
| GB | 2396711 A | 6/2004 |

(Continued)

OTHER PUBLICATIONS

Wikipedia.org, "Error-correcting Code", Feb. 23, 2006, Wikimedia Foundation, Inc., <http://en.wikipedia.org/wiki/Error-correcting_code>.*

(Continued)

*Primary Examiner*—Mark Rinehart
*Assistant Examiner*—Faisal M Zaman
(74) *Attorney, Agent, or Firm*—Cantor Colburn LLP; Lynn Augspurger

(57) ABSTRACT

A memory subsystem that includes segment level sparing. The memory subsystem includes a cascaded interconnect system with segment level sparing. The cascaded interconnect system includes two or more memory assemblies and a memory bus. The memory bus includes multiple segments and the memory assemblies are interconnected via the memory bus.

5 Claims, 13 Drawing Sheets

U.S. PATENT DOCUMENTS

| | | | |
|---|---|---|---|
| 4,641,263 A | 2/1987 | Perlman et al. | |
| 4,654,857 A * | 3/1987 | Samson et al. | 714/5 |
| 4,723,120 A | 2/1988 | Petty, Jr. | |
| 4,740,916 A | 4/1988 | Martin | |
| 4,796,231 A | 1/1989 | Pinkham | 385/189.05 |
| 4,803,485 A | 2/1989 | Rypinski | 370/452 |
| 4,833,605 A | 5/1989 | Terada et al. | |
| 4,839,534 A | 6/1989 | Clasen | |
| 4,943,984 A | 7/1990 | Pechanek et al. | |
| 4,985,828 A | 1/1991 | Shimizu et al. | |
| 5,053,947 A | 10/1991 | Heibel et al. | |
| 5,177,375 A | 1/1993 | Ogawa et al. | |
| 5,206,946 A | 4/1993 | Brunk | 710/2 |
| 5,214,747 A | 5/1993 | Cok | |
| 5,265,049 A | 11/1993 | Takasugi | |
| 5,265,212 A | 11/1993 | Bruce, II | 710/113 |
| 5,287,531 A | 2/1994 | Rogers, Jr. et al. | |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | |
| 5,394,535 A | 2/1995 | Ohuchi | 711/155 |
| 5,454,091 A | 9/1995 | Sites et al. | |
| 5,475,690 A | 12/1995 | Burns et al. | |
| 5,513,135 A | 4/1996 | Dell et al. | |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | |
| 5,594,925 A | 1/1997 | Harder et al. | |
| 5,611,055 A | 3/1997 | Krishan et al. | |
| 5,613,077 A | 3/1997 | Leung et al. | |
| 5,627,963 A * | 5/1997 | Gabillard et al. | 714/42 |
| 5,629,685 A | 5/1997 | Allen et al. | |
| 5,661,677 A | 8/1997 | Rondeau, II et al. | |
| 5,666,480 A | 9/1997 | Leung et al. | |
| 5,684,418 A | 11/1997 | Yanagiuchi | |
| 5,706,346 A | 1/1998 | Katta et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | |
| 5,917,760 A | 6/1999 | Millar | |
| 5,926,838 A | 7/1999 | Jeddeloh | |
| 5,928,343 A | 7/1999 | Farmwald et al. | |
| 5,930,273 A | 7/1999 | Mukojima | 714/776 |
| 5,959,914 A * | 9/1999 | Gates et al. | 365/201 |
| 5,973,951 A | 10/1999 | Bechtolsheim et al. | |
| 5,974,493 A | 10/1999 | Okumura et al. | 710/307 |
| 5,995,405 A | 11/1999 | Trick | |
| 6,003,121 A | 12/1999 | Wirt | |
| 6,011,732 A * | 1/2000 | Harrison et al. | 365/194 |
| 6,038,132 A | 3/2000 | Tokunaga et al. | 361/760 |
| 6,049,476 A | 4/2000 | Laudon et al. | |
| 6,076,158 A | 6/2000 | Sites et al. | |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | |
| 6,128,746 A | 10/2000 | Clark et al. | |
| 6,145,028 A * | 11/2000 | Shank et al. | 710/31 |
| 6,170,047 B1 | 1/2001 | Dye | |
| 6,170,059 B1 | 1/2001 | Pruett et al. | |
| 6,173,382 B1 | 1/2001 | Dell et al. | 711/170 |
| 6,185,718 B1 | 2/2001 | Dell et al. | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 * | 9/2001 | Torbey | 323/237 |
| 6,292,903 B1 | 9/2001 | Coteus et al. | |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | |
| 6,321,343 B1 | 11/2001 | Toda | |
| 6,338,113 B1 | 1/2002 | Kubo et al. | |
| 6,349,390 B1 | 2/2002 | Dell et al. | |
| 6,357,018 B1 | 3/2002 | Stuewe et al. | |
| 6,370,631 B1 | 4/2002 | Dye | |
| 6,378,018 B1 | 4/2002 | Tsern et al. | |
| 6,381,685 B2 | 4/2002 | Dell et al. | |
| 6,393,512 B1 | 5/2002 | Chen et al. | |
| 6,393,528 B1 | 5/2002 | Arimilli et al. | |
| 6,408,398 B1 | 6/2002 | Freker et al. | |
| 6,425,044 B1 | 7/2002 | Jeddeloh | |
| 6,446,174 B1 | 9/2002 | Dow | |
| 6,467,013 B1 | 10/2002 | Nizar | |
| 6,473,836 B1 | 10/2002 | Ikeda | |
| 6,477,614 B1 | 11/2002 | Leddige et al. | |
| 6,483,755 B2 | 11/2002 | Leung et al. | |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | |
| 6,496,540 B1 | 12/2002 | Windmer | |
| 6,496,910 B1 | 12/2002 | Baentsch et al. | |
| 6,499,070 B1 | 12/2002 | Whetsel | |
| 6,502,161 B1 | 12/2002 | Perego et al. | |
| 6,507,888 B2 | 1/2003 | Wu et al. | |
| 6,510,100 B2 | 1/2003 | Grundon et al. | |
| 6,513,091 B1 | 1/2003 | Blackmon et al. | |
| 6,526,469 B1 | 2/2003 | Drehmel et al. | |
| 6,530,007 B2 | 3/2003 | Olarig | |
| 6,532,525 B1 | 3/2003 | Aleksic et al. | |
| 6,546,359 B1 | 4/2003 | Week | 702/186 |
| 6,549,971 B1 | 4/2003 | Cecchi et al. | |
| 6,553,450 B1 | 4/2003 | Dodd et al. | |
| 6,557,069 B1 | 4/2003 | Drehmel et al. | |
| 6,564,329 B1 | 5/2003 | Cheung et al. | |
| 6,584,576 B1 | 6/2003 | Co | |
| 6,587,912 B2 | 7/2003 | Leddige et al. | |
| 6,590,827 B2 | 7/2003 | Chang et al. | |
| 6,594,748 B1 | 7/2003 | Lin | |
| 6,601,121 B2 | 7/2003 | Singh et al. | |
| 6,601,149 B1 | 7/2003 | Brock et al. | |
| 6,604,180 B2 | 8/2003 | Jeddeloh | |
| 6,611,905 B1 | 8/2003 | Grundon et al. | |
| 6,622,217 B2 | 9/2003 | Gharachorloo et al. | |
| 6,625,687 B1 | 9/2003 | Halbert et al. | |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | |
| 6,684,320 B2 | 1/2004 | Mohamed et al. | |
| 6,697,919 B2 | 2/2004 | Gharachorloo et al. | |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 * | 6/2004 | Curley | 710/316 |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | |

| | | | | | | |
|---|---|---|---|---|---|---|
| 6,877,076 B1 | 4/2005 | Cho et al. | | 2004/0163028 A1 | 8/2004 | Olarig |
| 6,877,078 B2 | 4/2005 | Fujiwara et al. | | 2004/0165609 A1 | 8/2004 | Herbst et al. |
| 6,882,082 B2 | 4/2005 | Greeff et al. | | 2004/0199363 A1 | 10/2004 | Bohizic et al. |
| 6,889,284 B1 | 5/2005 | Nizar et al. | | 2004/0205433 A1 | 10/2004 | Gower et al. |
| 6,898,726 B1 | 5/2005 | Lee | | 2004/0230718 A1 | 11/2004 | Polzin et al. |
| 6,910,146 B2 | 6/2005 | Dow | | 2004/0246767 A1 * | 12/2004 | Vogt ............................ 365/154 |
| 6,918,068 B2 * | 7/2005 | Vail et al. ...................... 714/56 | | 2004/0250153 A1 | 12/2004 | Vogt ............................ 713/500 |
| 6,938,119 B2 | 8/2005 | Kohn et al. | | 2004/0260909 A1 | 12/2004 | Lee et al. |
| 6,944,084 B2 | 9/2005 | Wilcox | | 2004/0260957 A1 | 12/2004 | Jeddeloh et al. |
| 6,948,091 B2 | 9/2005 | Bartels et al. | | 2005/0023560 A1 | 2/2005 | Ahn et al. ..................... 257/200 |
| 6,949,950 B2 | 9/2005 | Takahashi et al. | | 2005/0033906 A1 | 2/2005 | Mastronarde et al. |
| 6,965,952 B2 | 11/2005 | Echartea et al. | | 2005/0044305 A1 | 2/2005 | Jakobs et al. |
| 6,977,536 B2 | 12/2005 | Chin-Chich et al. | | 2005/0044457 A1 | 2/2005 | Jeddeloh |
| 6,993,612 B2 | 1/2006 | Porterfield | | 2005/0050237 A1 | 3/2005 | Jeddeloh |
| 7,039,755 B1 | 5/2006 | Helms | | 2005/0050255 A1 | 3/2005 | Jeddeloh |
| 7,047,371 B2 | 5/2006 | Dortu | | 2005/0066136 A1 | 3/2005 | Schnepper |
| 7,047,384 B2 | 5/2006 | Bodas et al. | | 2005/0071542 A1 | 3/2005 | Weber et al. |
| 7,076,700 B2 * | 7/2006 | Rieger ........................ 714/710 | | 2005/0080581 A1 | 4/2005 | Zimmerman et al. |
| 7,103,792 B2 | 9/2006 | Moon | | 2005/0081129 A1 | 4/2005 | Shah et al. |
| 7,120,743 B2 | 10/2006 | Meyer et al. | | 2005/0086441 A1 | 4/2005 | Myer et al. |
| 7,133,790 B2 | 11/2006 | Liou | | 2005/0097249 A1 | 5/2005 | Oberlin et al. |
| 7,133,972 B2 | 11/2006 | Jeddeloh et al. | | 2005/0120157 A1 | 6/2005 | Chen et al. |
| 7,177,211 B2 | 2/2007 | Zimmerman | | 2005/0125702 A1 | 6/2005 | Huang et al. |
| 7,194,593 B2 | 3/2007 | Schnepper | | 2005/0125703 A1 | 6/2005 | Lefurgy et al. |
| 7,197,594 B2 | 3/2007 | Raz et al. | | 2005/0138246 A1 | 6/2005 | Chen et al. |
| 7,206,887 B2 | 4/2007 | Jeddeloh | | 2005/0138267 A1 | 6/2005 | Bains et al. |
| 7,206,962 B2 | 4/2007 | Deegan | | 2005/0144399 A1 | 6/2005 | Hosomi |
| 7,210,059 B2 | 4/2007 | Jeddeloh | | 2005/0149665 A1 | 7/2005 | Wolrich et al. |
| 7,216,196 B2 | 5/2007 | Jeddeloh | | 2005/0166006 A1 | 7/2005 | Talbot |
| 7,227,949 B2 | 6/2007 | Heegard et al. | | 2005/0177677 A1 | 8/2005 | Jeddeloh |
| 7,240,145 B2 | 7/2007 | Holman | | 2005/0177690 A1 | 8/2005 | LaBerge |
| 7,260,685 B2 | 8/2007 | Lee et al. | | 2005/0204216 A1 | 9/2005 | Daily et al. .................. 714/724 |
| 7,266,634 B2 | 9/2007 | Ware | | 2005/0216678 A1 | 9/2005 | Jeddeloh |
| 7,296,129 B2 * | 11/2007 | Gower et al. ................. 711/167 | | 2005/0223196 A1 | 10/2005 | Knowles |
| 7,313,583 B2 | 12/2007 | Porten et al. | | 2005/0229132 A1 | 10/2005 | Butt et al. |
| 7,321,979 B2 | 1/2008 | Lee | | 2005/0248997 A1 | 11/2005 | Lee |
| 7,353,316 B2 | 4/2008 | Erdmann | | 2005/0257005 A1 | 11/2005 | Jeddeloh |
| 7,363,419 B2 | 4/2008 | Cronin et al. | | 2005/0259496 A1 | 11/2005 | Hsu et al. |
| 7,363,436 B1 | 4/2008 | Yeh et al. | | 2005/0289377 A1 | 12/2005 | Luong |
| 7,421,525 B2 | 9/2008 | Polzin et al. | | 2006/0036826 A1 | 2/2006 | Dell et al. |
| 2001/0000822 A1 | 5/2001 | Dell et al. | | 2006/0036827 A1 | 2/2006 | Dell et al. |
| 2001/0003839 A1 | 6/2001 | Kondo | | 2006/0080584 A1 | 4/2006 | Hartnett et al. |
| 2001/0029566 A1 | 10/2001 | Woo | | 2006/0085602 A1 | 4/2006 | Huggahalli et al. |
| 2002/0019926 A1 | 2/2002 | Huppenthal et al. | | 2006/0095592 A1 | 5/2006 | Borkenhagen |
| 2002/0038405 A1 | 3/2002 | Leddige et al. | | 2006/0095679 A1 | 5/2006 | Edirisooriya |
| 2002/0059439 A1 | 5/2002 | Arroyo et al. | | 2006/0107175 A1 | 5/2006 | Dell et al. |
| 2002/0083255 A1 | 6/2002 | Greeff et al. | | 2006/0112238 A1 | 5/2006 | Jamil et al. |
| 2002/0103988 A1 | 8/2002 | Dornier | | 2006/0161733 A1 | 7/2006 | Beckett et al. |
| 2002/0112119 A1 | 8/2002 | Halbert et al. | | 2006/0195631 A1 | 8/2006 | Rajamani |
| 2002/0112194 A1 | 8/2002 | Uzelac | | 2006/0288172 A1 | 12/2006 | Lee et al. |
| 2002/0124195 A1 | 9/2002 | Nizar | | 2007/0005922 A1 | 1/2007 | Swaminathan et al. |
| 2002/0124201 A1 | 9/2002 | Edwards et al. | | 2007/0025304 A1 | 2/2007 | Leelahakriengkrai et al. |
| 2002/0147898 A1 | 10/2002 | Rentschler et al. | | 2007/0038907 A1 | 2/2007 | Jeddeloh et al. |
| 2002/0174274 A1 | 11/2002 | Wu et al. | | 2007/0160053 A1 | 7/2007 | Coteus |
| 2003/0009632 A1 | 1/2003 | Arimilli et al. | | | | |
| 2003/0028701 A1 | 2/2003 | Rao et al. | | | | |

FOREIGN PATENT DOCUMENTS

| | | | |
|---|---|---|---|
| JP | 59153353 A | | 9/1984 |
| JP | 0114410 A | * | 6/1989 |
| JP | 04326140 A | | 11/1992 |
| JP | 10011971 | | 1/1998 |
| JP | 2004139552 A | * | 5/2004 |
| JP | 2008003711 A | * | 1/2008 |
| WO | 9621188 | | 7/1996 |
| WO | WO 9812651 A1 | * | 3/1998 |
| WO | 0223353 A2 | | 3/2002 |
| WO | WO2005/038660 | | 4/2005 |
| WO | WO 2007109888 A1 | * | 10/2007 |

| | | | |
|---|---|---|---|
| 2003/0033364 A1 | 2/2003 | Garnett et al. | |
| 2003/0051055 A1 | 3/2003 | Parrella et al. | |
| 2003/0056183 A1 | 3/2003 | Kobayahi | |
| 2003/0084309 A1 | 5/2003 | Kohn ........................ 713/189 |
| 2003/0090879 A1 | 5/2003 | Doblar et al. | |
| 2003/0105938 A1 | 6/2003 | Cooksey et al. | |
| 2003/0118044 A1 | 6/2003 | Blanc et al. | |
| 2003/0126363 A1 | 7/2003 | David | |
| 2003/0223303 A1 | 12/2003 | Lamb et al. | |
| 2003/0236959 A1 | 12/2003 | Johnson et al. | |
| 2004/0006674 A1 | 1/2004 | Hargis et al. | |
| 2004/0049723 A1 | 3/2004 | Obara ........................ 714/729 |
| 2004/0098549 A1 | 5/2004 | Dorst | |
| 2004/0117588 A1 | 6/2004 | Arimilli et al. | |
| 2004/0123222 A1 | 6/2004 | Widmer | |
| 2004/0128474 A1 | 7/2004 | Vorbach ........................ 712/10 |
| 2004/0148482 A1 | 7/2004 | Grundy et al. | |

OTHER PUBLICATIONS

Yang, Q.; Bhuyan, L.N., "Analysis of packet-switched multiple-bus multiprocessor systems," Computers, IEEE Transactions on, vol. 40, No. 3, pp. 352-357, Mar. 1991.*

Li, P.; Martinez, J.; Tang, J.; Priore, S.; Hubbard, K.; Jie Xue; Poh, E.; Ong MeiLin; Chok KengYin; Hallmark, C.; Mendez, D., "Development and evaluation of a high performance fine pitch SODIMM socket package," Electronic Components and Technology Conference, 2004. Proceedings. 54th , vol. 1, No., pp. 1161-1166 vol. 1, Jun. 1-4, 2004.*

Sivencrona et al.; "RedCAN™; Simulations of two Fault Recovery Algorithms for CAN;" Proceedings for the 10th IEEE Pacific Rim International Symposium on Dependable Computing (PRDC'04); 2005.

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Reapeaters in Bidirectional Buses;" IEEE Transactions on Computer-Aided Design of Integrated Cirucits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Benini, Luca, et al. "System-Level Power Optimization: Techniques and Tools", ACM Transactions on Design Automation of Electronic Systems, vol. 6, No. 2, Apr. 2001, pp. 149-206.

Boudon, et al., "Novel Bus Reconfiguration Scheme With Spare Lines", IBM Technical Disclosure Bulletin, May 1987, vol. 29, No. 12, pp. 1-3.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction, Org, pp. 1-5, http://www.directron.com/directron/fsbguide.html.

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

NB940259 (IBM Technical Disclosure Bulletin, Feb. 1994; vol. 37; pp. 59-64.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommunications", Second Edition, John Wiley & Sons, Inc. 1987. 3 pgs.

Wikipedia, Serial Communications, [online], [retrieved Apr. 10, 2007 from the Internet], http://en.wikipedia.org/wiki/Serial_communications, 3 pages.

PCT Search Report. PCT/EP2007/057915. Mailed Nov. 7, 2007.

PCT International Search Report PCT/EP2006/068984. Mailed Feb. 16, 2007.

PCT International Search Report PCT/EP2007/057916. Mailed Dec. 14, 2007.

International Search Report, International Application No. PCT/EP2007/054929, International Publication No. WO 2007/135144 A1, received Mar. 21, 2008.

Joe Jeddeloh, "Fully Buffered DIMM (FB-DIMM)", XP002490174, Advanced Systems Technology, Micron Technology, Inc. Apr. 16, 2008, 23 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 1, 1987, pp. 5590-5593.

European Search Report, European Patent Application No. 05106700.7-2224, received Aug. 11, 2008.

International Search Report, International Patent Application No. PCT/US07/75944, mailed Sep. 23, 2008.

European Search Report, European Patent Application No. 05106701.5, mailed Oct. 7, 2008.

European Search Report, European Patent Application No. 05109837, mailed Oct. 7, 2008.

* cited by examiner

| Downstream Format : 9 data – 8 cmd – 4 ecc – 1 spare – 1 diff clk = 24 TOTAL WIRES | | | | | | | | | | | | | | | | | | | | | | | |
|---|---|---|---|---|---|---|---|---|---|---|---|---|---|---|---|---|---|---|---|---|---|---|---|
| s3_us(#) d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Xfer/Bit | spare | ecc0 | ecc1 | ecc2 | ecc3 | di0 | di1 | di2 | di3 | di4 | di5 | di6 | di7 | di8 | c0 | c1 | c2 | c3 | c4 | c5 | c6 | c7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C66 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C67 |

S : Spare bits 1202
E : ECC check bits 1204
D : Write data bits 1206
C : Command bits 1208

FIG. 12

| Upstream Format : 18 data + 4 ecc + 1 spare + 1 diff clk = 25 TOTAL WIRES | | | | | | | | | | | | | | | | | | | | | | | |
|---|---|---|---|---|---|---|---|---|---|---|---|---|---|---|---|---|---|---|---|---|---|---|
| s3_us(#) / d3_s3(#) Xfer/Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| | spare | ecc0 | ecc1 | ecc2 | ecc3 | do0 | do1 | do2 | do3 | do4 | do5 | do6 | do7 | do8 | do9 | do10 | do11 | do12 | do13 | do14 | do15 | do16 | do17 |
| 0 | S0 | E00 | E10 | E20 | E30 | D00 | D10 | D20 | D30 | D40 | D50 | D60 | D70 | D80 | D90 | D100 | D110 | D120 | D130 | D140 | D150 | D160 | D170 |
| 1 | S1 | E01 | E11 | E21 | E31 | D01 | D11 | D21 | D31 | D41 | D51 | D61 | D71 | D81 | D91 | D101 | D111 | D121 | D131 | D141 | D151 | D161 | D171 |
| 2 | S2 | E02 | E12 | E22 | E32 | D02 | D12 | D22 | D32 | D42 | D52 | D62 | D72 | D82 | D92 | D102 | D112 | D122 | D132 | D142 | D152 | D162 | D172 |
| 3 | S3 | E03 | E13 | E23 | E33 | D03 | D13 | D23 | D33 | D43 | D53 | D63 | D73 | D83 | D93 | D103 | D113 | D123 | D133 | D143 | D153 | D163 | D173 |
| 4 | S4 | E04 | E14 | E24 | E34 | D04 | D14 | D24 | D34 | D44 | D54 | D64 | D74 | D84 | D94 | D104 | D114 | D124 | D134 | D144 | D154 | D164 | D174 |
| 5 | S5 | E05 | E15 | E25 | E35 | D05 | D15 | D25 | D35 | D45 | D55 | D65 | D75 | D85 | D95 | D105 | D115 | D125 | D135 | D145 | D155 | D165 | D175 |
| 6 | S6 | E06 | E16 | E26 | E36 | D06 | D16 | D26 | D36 | D46 | D56 | D66 | D76 | D86 | D96 | D106 | D116 | D126 | D136 | D146 | D156 | D166 | D176 |
| 7 | S7 | E07 | E17 | E27 | E37 | D07 | D17 | D27 | D37 | D47 | D57 | D67 | D77 | D87 | D97 | D107 | D117 | D127 | D137 | D147 | D157 | D167 | D177 |

S : Spare bits
1302

E : ECC check bits
1304

D : Write data bits
1306

FIG. 13

SYSTEM, METHOD AND STORAGE MEDIUM FOR PROVIDING SEGMENT LEVEL SPARING

BACKGROUND OF THE INVENTION

The invention relates to a memory subsystem and in particular, to a memory subsystem that provides segment level sparing.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pincount, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory subsystem 10 that includes up to four registered dual inline memory modules (DIMMs) 40 on a traditional multi-drop stub bus channel. The subsystem includes a memory controller 20, an external clock buffer 30, registered DIMMs 40, address bus 50, control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EE-PROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multi-point communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. The memory controller 111 is connected to a memory bus 315, which further connects to module 310a. The information on bus 315 is re-driven by the buffer on module 310a to the next module, 310b, which further re-drives the bus 315 to module positions denoted as 310n. Each module 310a includes a DRAM 311a and a buffer 320a. The bus 315 may be described as having a daisy chain structure, with each bus being point-to-point in nature.

One drawback to the use of a daisy chain bus is that it increases the probability of a failure causing multiple memory modules to be affected along the bus. For example, if the first module is non-functional then the second and subsequent modules on the bus will also be non-functional.

BRIEF SUMMARY OF THE INVENTION

Exemplary embodiments of the present invention include a memory subsystem with a cascaded interconnect system with segment level sparing. The cascaded interconnect system includes two or more memory assemblies and a memory bus. The memory bus includes multiple segments and the memory assemblies are interconnected via the memory bus.

Additional exemplary embodiments include a method for providing segment level sparing. The method includes receiving an input signal at a current memory assembly, wherein the current memory assembly is included in a cascaded interconnect system that includes a plurality of memory assemblies that are interconnected via a memory bus which includes a plurality of segments. Bits in the input signal are repositioned in response to one of the bits being associated with a failing segment in an upstream or downstream memory assembly.

Further exemplary embodiments include a storage medium for providing a memory subsystem with segment level sparing. The storage medium is encoded with machine readable computer program code for providing segment level sparing. The storage medium includes instructions for causing a computer to implement a method including receiving an input signal at a current memory assembly, wherein the current memory assembly is included in a cascaded interconnect system that includes a plurality of memory assemblies that are interconnected via a memory bus which includes a plurality of segments. Bits in the input signal are repositioned in response to one of the bits being associated with a failing segment in an upstream or downstream memory assembly.

BRIEF DESCRIPTION OF THE DRAWINGS

Referring now to the drawings wherein like elements are numbered alike in the several FIGURES:

FIG. 12 depicts a downstream frame format that is utilized by exemplary embodiments of the present invention;

FIG. 13 depicts an upstream frame format that is utilized by exemplary embodiments of the present invention;

DETAILED DESCRIPTION OF THE PREFERRED EMBODIMENTS

Exemplary embodiments of the present invention provide segment level sparing, or the ability to replace any failing interconnect (e.g., due to a wire failure, a connector failure, a driver failure and/or a receiver failure) between any two assemblies (i.e., between a memory controller and a memory module, or between any two memory modules) on a memory channel. Segment level sparing can be performed on both an upstream bus and a downstream bus, with at least one replacement wire per bus per segment. In other words, each segment on each bus (controller to first DIMM, first DIMM to second DIMM, second DIMM to third DIMM, etc. and back to the memory controller) can be logically replaced, by re-routing the information intended for transmission on each unique failing segment, to another 'replacement' or 'spare' segment. The ability to provide segment level sparing provides an improvement in reliability and survivability, in that an increased number of unique failures can be accommodated prior to the need for a system repair action.

In an exemplary embodiment of the present invention, segment level sparing is provided by a high speed and high reliability memory subsystem architecture and interconnect structure that includes single-ended point-to-point interconnections between any two subsystem components. The memory subsystem further includes a memory control function, one or more memory modules, one or more high speed busses operating at a four-to-one speed ratio relative to a DRAM data rate and a bus-to-bus converter chip on each of one or more cascaded modules to convert the high speed bus(ses) into the conventional double data rate (DDR) memory interface. The memory modules operate as slave devices to the memory controller, responding to commands in a deterministic or non-deterministic manner, but do not self-initiate unplanned bus activity, except in cases where operational errors are reported in a real-time manner. Memory modules can be added to the cascaded bus, with each module assigned an address to permit unique selection of each module on the cascaded bus. Exemplary embodiments of the present invention include a packetized multi-transfer interface which utilizes an innovative communication protocol to permit memory operation to occur on a reduced pincount, whereby address, command and data is transferred between the components on the cascaded bus over multiple cycles, and are reconstructed and errors corrected prior to being used by the intended recipient.

Figure 1:
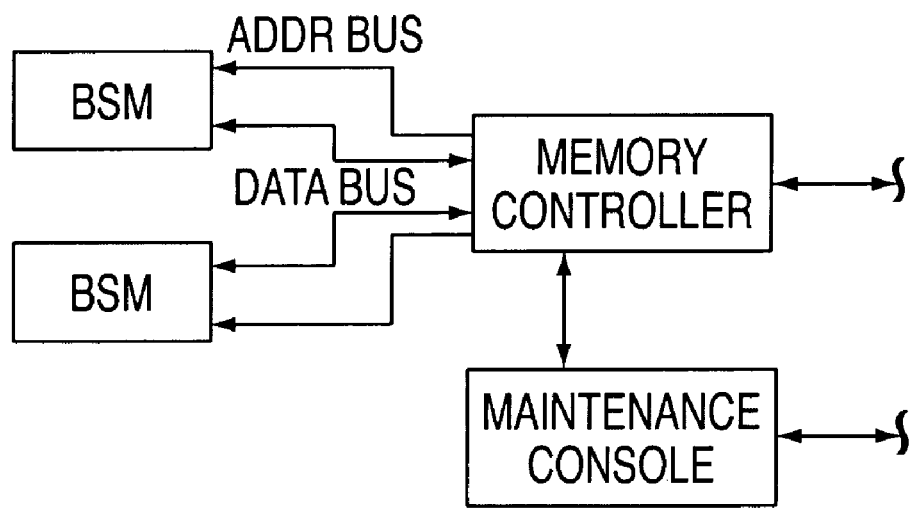
FIG. 1 depicts a prior art memory controller connected to two buffered memory assemblies via separate point-to-point links.
Figure 2:
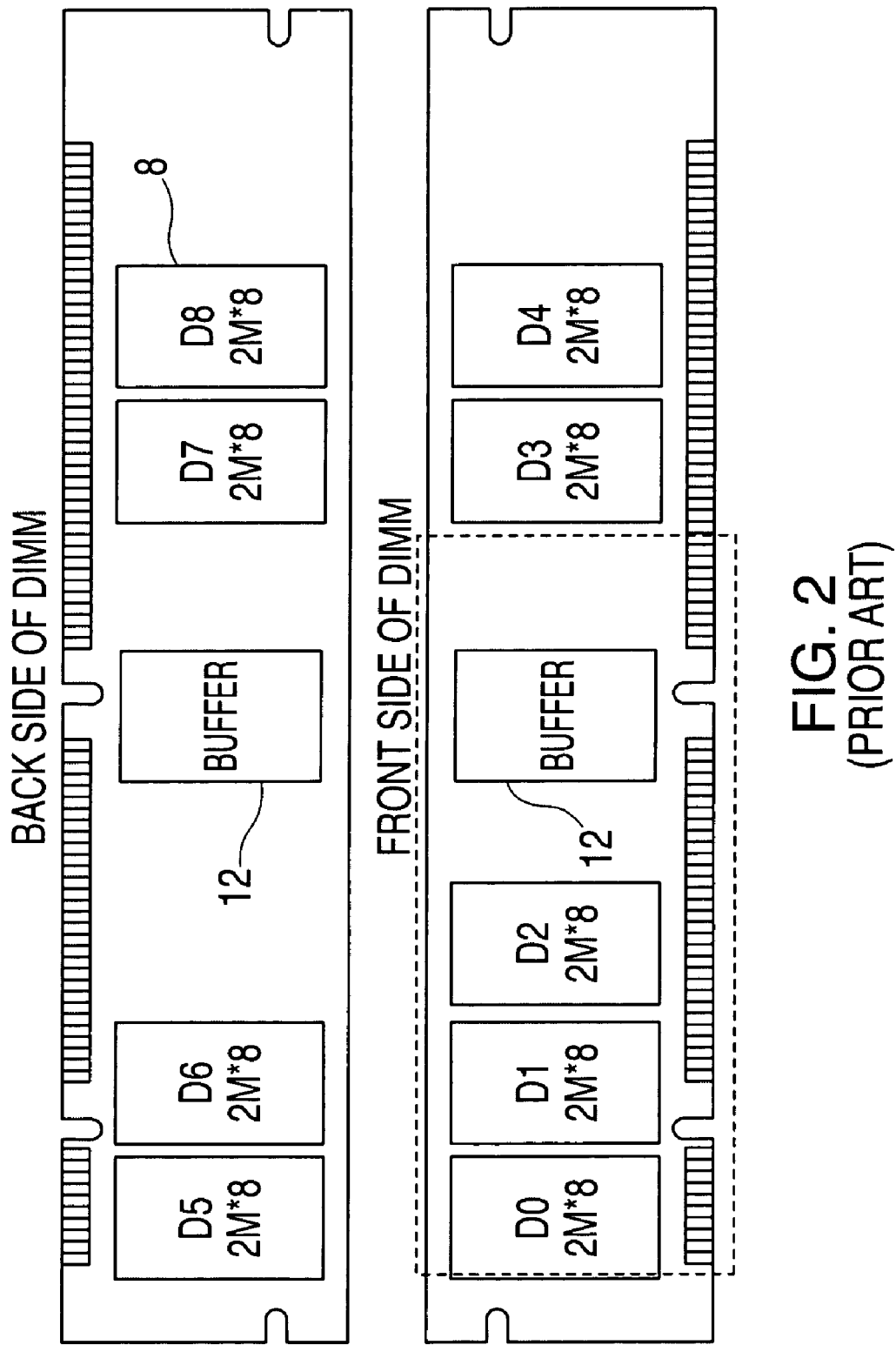
FIG. 2 depicts a prior art synchronous memory module with a buffer device.
Figure 3:
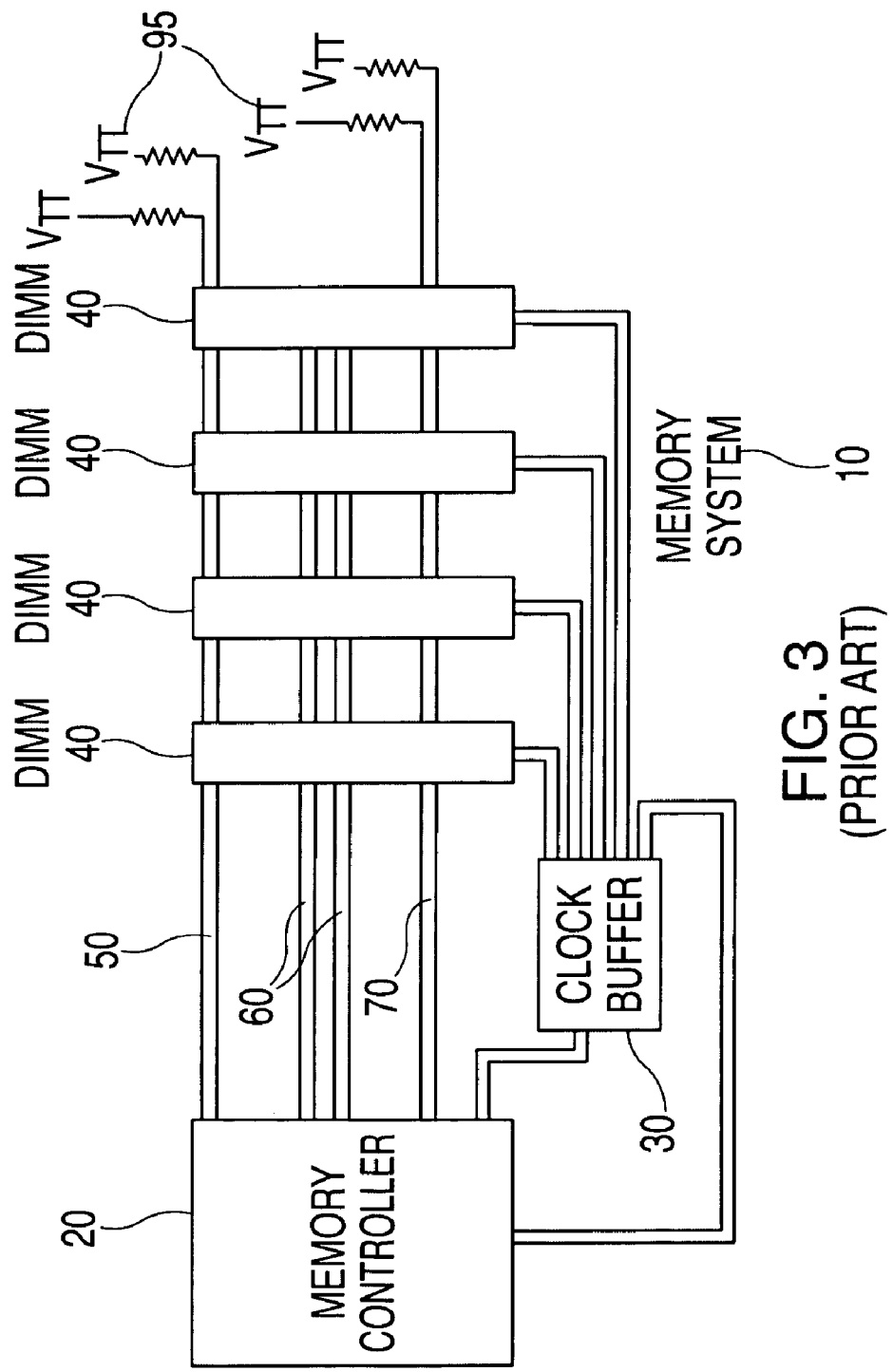
FIG. 3 depicts a prior art memory subsystem using registered DIMMs.
Figure 4:
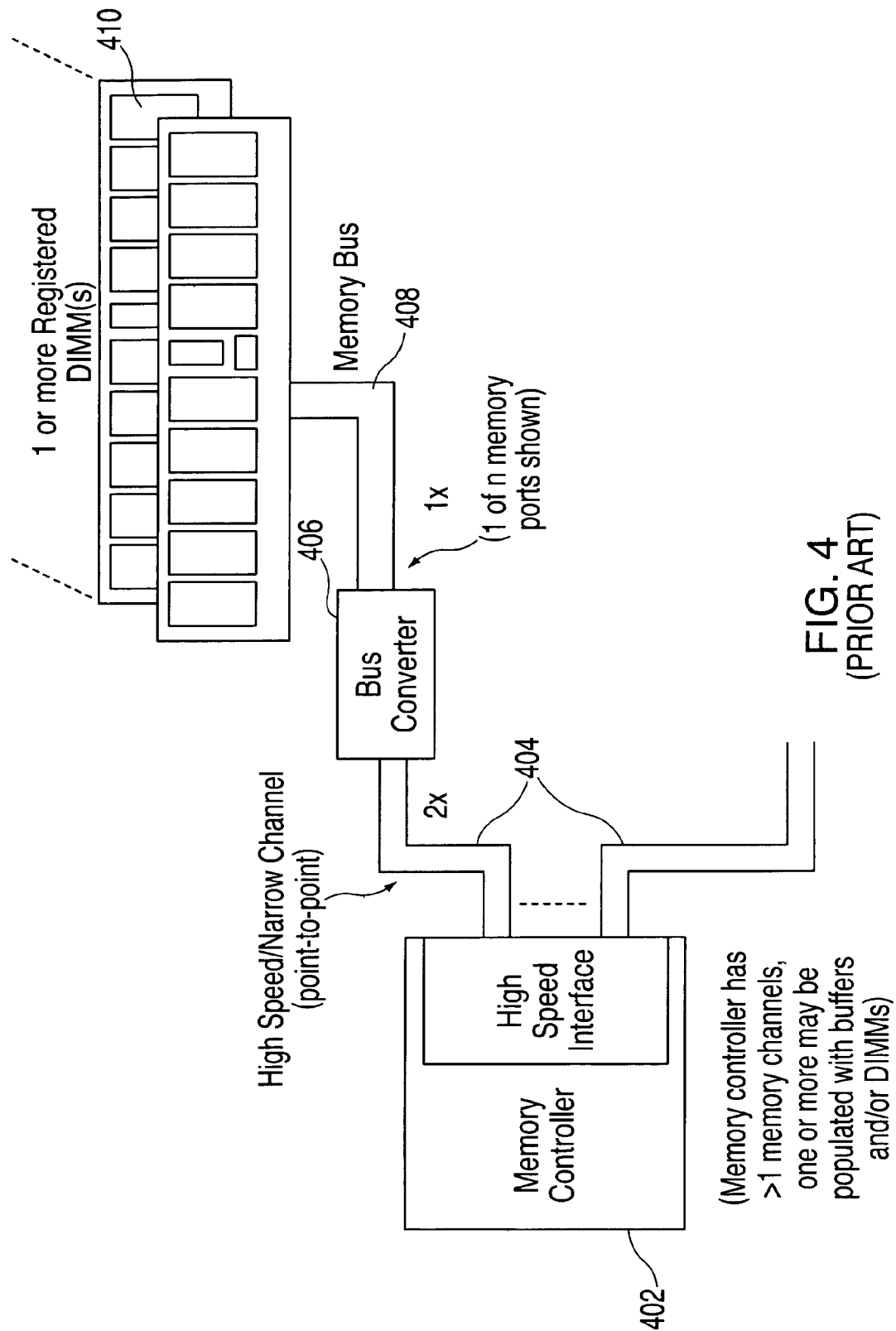
FIG. 4 depicts a prior art memory subsystem with point-to-point channels, registered DIMMs, and a 2:1 bus speed multiplier
Figure 5:
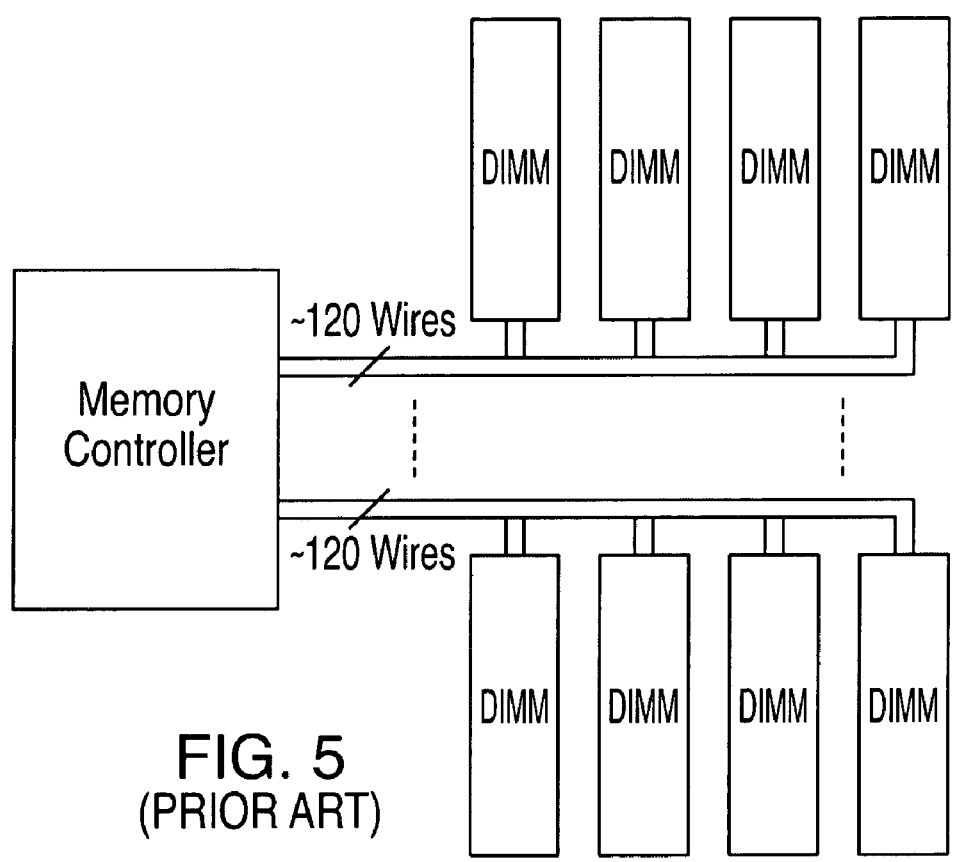
FIG. 5 depicts a prior art memory structure that utilizes a multi-drop memory 'stub' bus.
Figure 6:
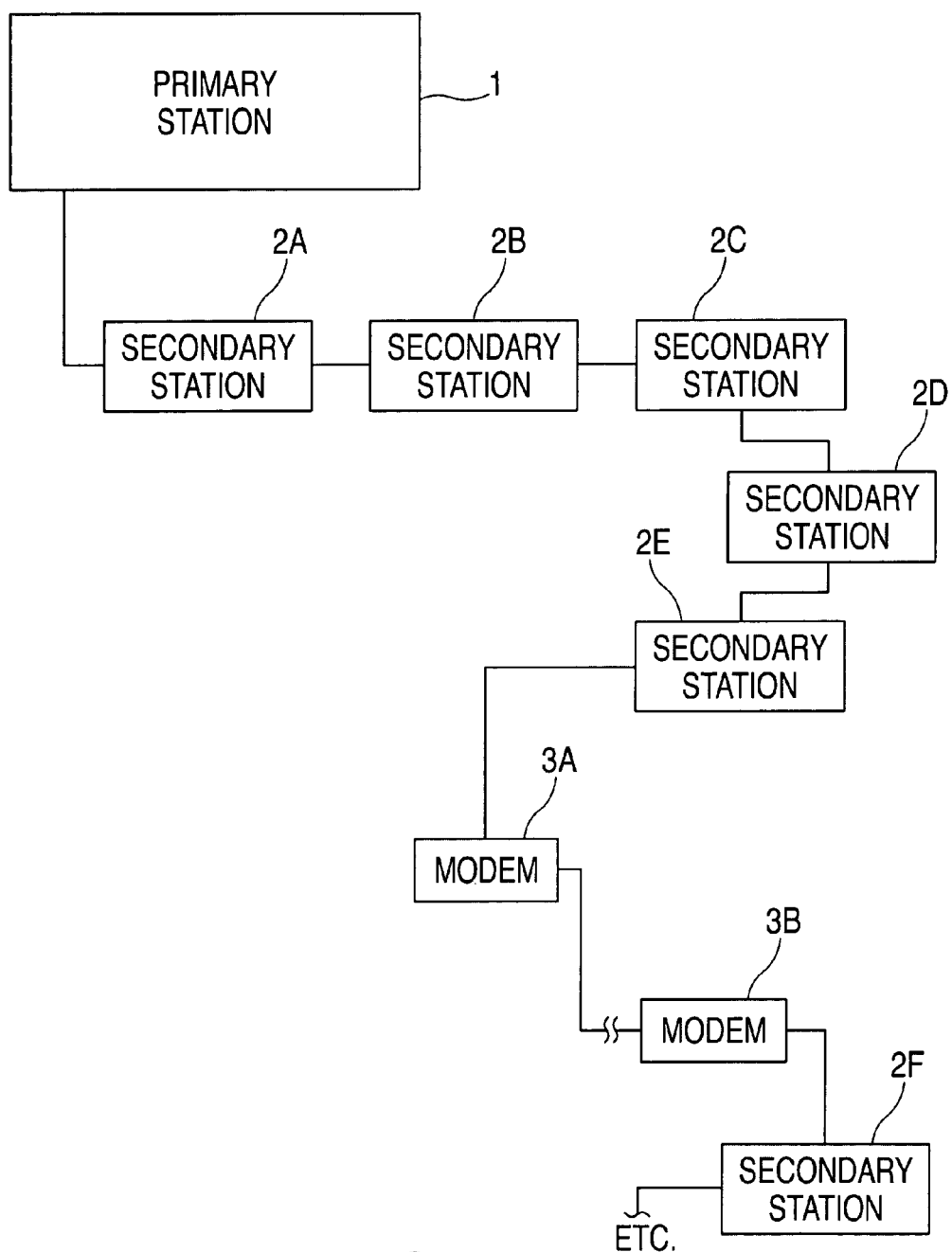
FIG. 6 depicts a prior art daisy chain structure in a multi-point communication structure that would otherwise require multiple ports.
Figure 7:
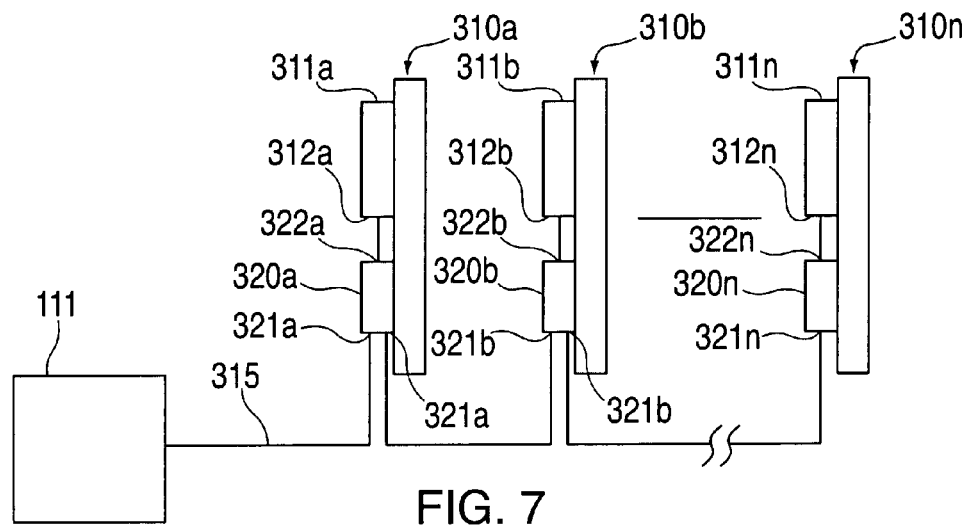
FIG. 7 depicts a prior art daisy chain connection between a memory controller and memory modules.
Figure 8:
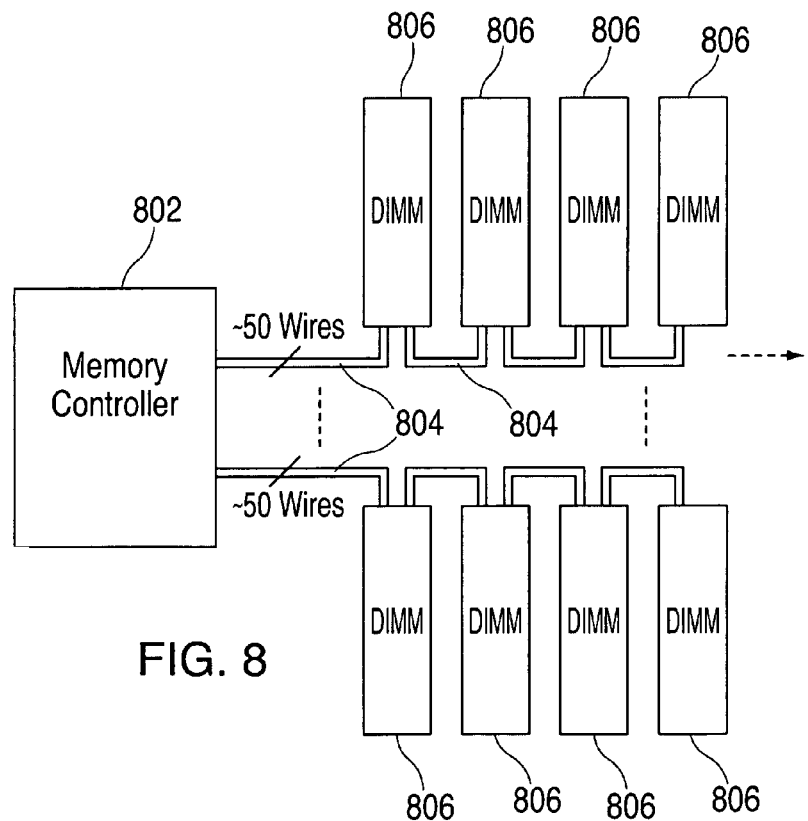
FIG. 8 depicts a cascaded memory structure that is utilized by exemplary embodiments of the present invention.

FIG. 8 depicts a cascaded memory structure that may be utilized by exemplary embodiments of the present invention when buffered memory modules 806 (e.g., the buffer device is included within the memory module 806) are in communication with the memory controller 802. This memory structure includes a memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module, to permit memory modules to be cascaded such that each memory module is interconnected to other memory modules as well as to the memory controller 802.

Figure 9:
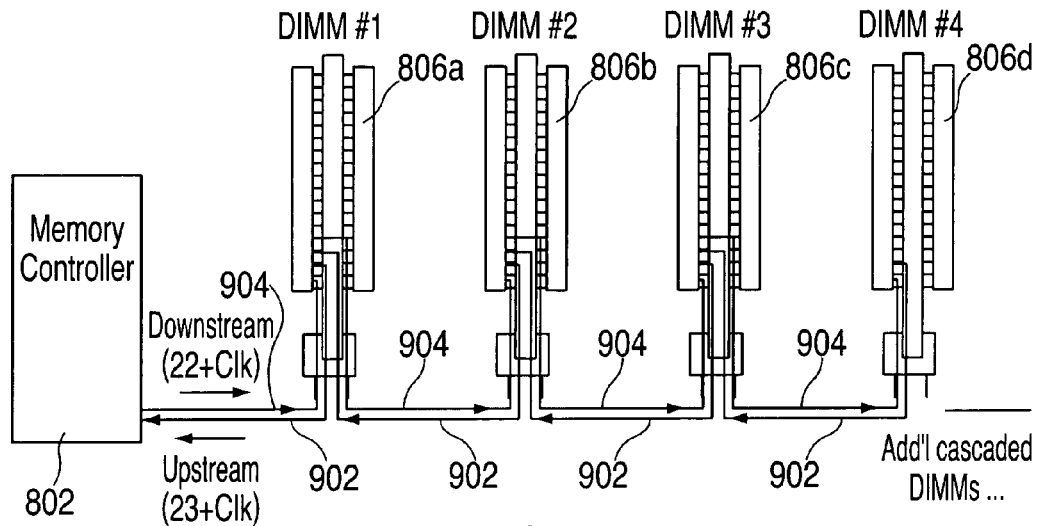
FIG. 9 depicts a memory structure with cascaded memory modules and unidirectional busses that is utilized by exemplary embodiments of the present invention.

FIG. 9 depicts a memory structure with cascaded memory modules and unidirectional busses that is utilized by exemplary embodiments of the present invention if all of the memory modules 806 are buffered memory modules 806. One of the functions provided by the memory modules 806 in the cascade structure is a redrive function to send signals on the memory bus to other memory modules 806 or to a memory controller 802. FIG. 9 includes a memory controller 802 and four memory modules 806a, 806b, 806c and 806d, on each of two memory busses (a downstream memory bus 904 and an upstream memory bus 902), connected to the memory controller 802 in either a direct or cascaded manner. Memory module 806*a* is connected to the memory controller 802 in a direct manner. Memory modules 806*b*, 806*c* and 806*d* are connected to the controller 802 in a cascaded manner.

An exemplary embodiment of the present invention includes two unidirectional busses between the memory controller 802 and memory module 806*a* ("DIMM #1") as well as between each successive memory module 806*b-d* ("DIMM #2", "DIMM #3" and "DIMM #4") in the cascaded memory structure. The downstream memory bus 904 is comprised of twenty-two single-ended signals and a differential clock pair. The downstream memory bus 904 is used to transfer address, control, data and error code correction (ECC) bits downstream from the memory controller 802, over several clock cycles, to one or more of the memory modules 806 installed on the cascaded memory channel. The upstream memory bus 902 is comprised of twenty-three single-ended signals and a differential clock pair, and is used to transfer bus-level data and ECC bits upstream from the sourcing memory module 806 to the memory controller 802. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Figure 10:
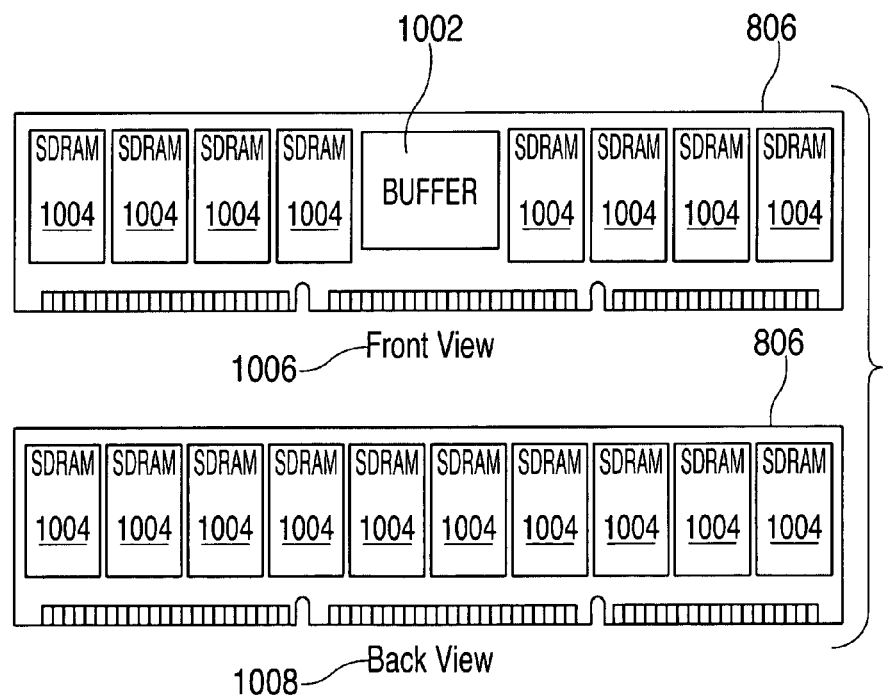
FIG. 10 depicts a buffered memory module that is utilized by exemplary embodiments of the present invention.

FIG. 10 depicts a front view 1006 and a back view 1008 of a buffered memory module 806 that is utilized by exemplary embodiments of the present invention. In exemplary embodiments of the present invention, each memory module 806 includes a blank card having dimensions of approximately six inches long by one and a half inches tall, eighteen DRAM positions, a multi-mode buffer device 1002, and numerous small components as known in the art that are not shown (e.g., capacitors, resistors, EEPROM.) In an exemplary embodiment of the present invention, the dimension of the card is 151.35 mm long by 30.5 mm tall. In an exemplary embodiment of the present invention, the multi-mode buffer device 1002 is located in the center region of the front side of the memory module 806, as depicted in the front view 1006 in FIG. 10. The synchronous DRAMS (SDRAMS) 1004 are located on either side of the multi-mode buffer device 1002, as well as on the backside of the memory module 806, as depicted in the back view 1008 in FIG. 10. The configuration may be utilized to facilitate high speed wiring to the multi-mode buffer device 1002 as well as signals from the buffer device to the SDRAMs 1004.

Figure 11:
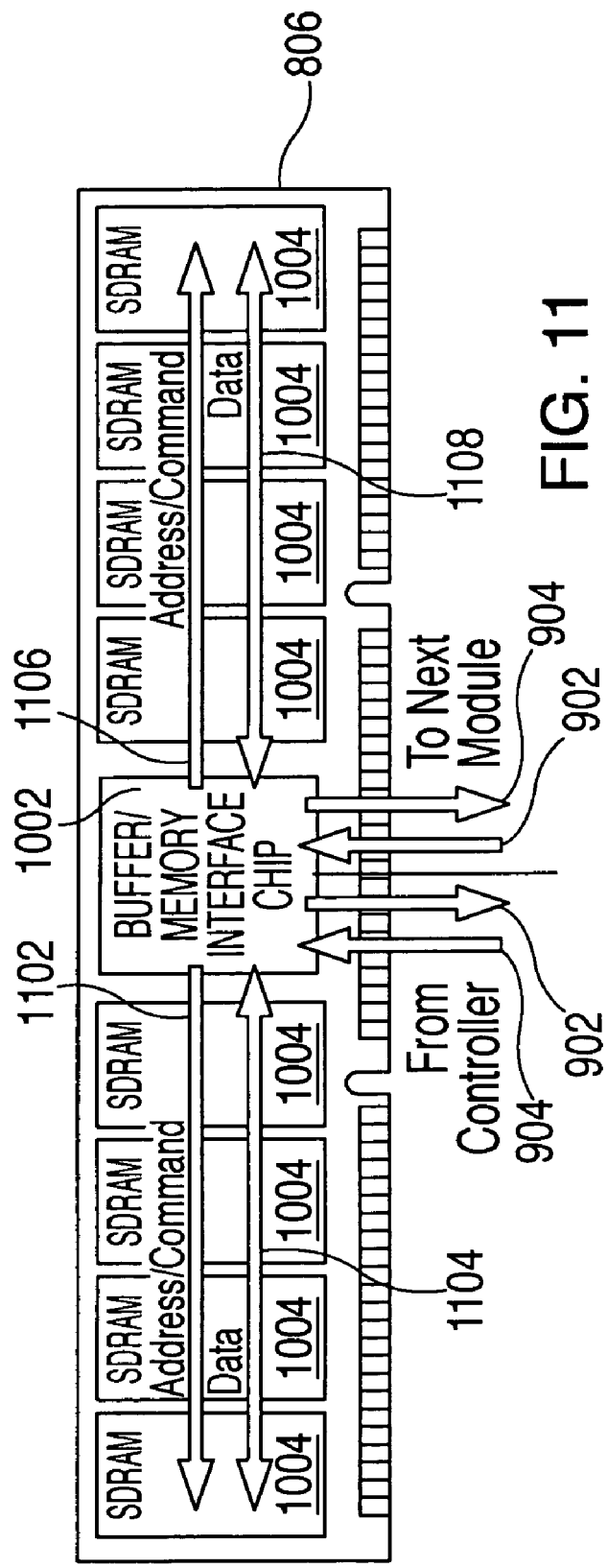
FIG. 11 depicts a buffered module wiring system that is utilized by exemplary embodiments of the present invention.

FIG. 11 depicts a buffered module wiring system that is utilized by exemplary embodiments of the present invention. FIG. 11 is a pictorial representation of the memory module 806 depicted in FIG. 10, with shaded arrows representing the primary signal flows. The signal flows include the upstream memory bus 902, the downstream memory bus 904, address and command busses 1102 and 1106, and data busses 1104 and 1108. In an exemplary embodiment of the present invention, the buffer device 1002, also referred to as a memory interface chip or a memory module, provides two copies of the address and command signals to the SDRAMs 1004 with a right address and command bus 1106 exiting from the right side of the buffer device 1002 for the SDRAMs 1004 located to the right side and behind the buffer module 1002 on the right. A left address and command bus 1102 exits from the left side of the buffer device 1002 and connecting to the SDRAMs 1004 to the left side and behind the buffer device 1002 on the left. Similarly, the data bits intended for SDRAMs 1004 to the right of the buffer devicee 1002 exit from the right of the buffer module 1002 on a right data bus 1108. The data bits intended for the left side of the buffer module 1002 exit from the left of the buffer device 1002 on a left data bus 1104. The high speed upstream memory bus 902 and downstream memory bus 904 exit from the lower portion of the buffer module 1002, and connect to a memory controller or other memory modules either upstream or downstream of this memory module 806, depending on the application. The buffer device 1002 receives signals that are four times the memory module data rate and converts them into signals at the memory module data rate.

FIG. 12 depicts a downstream frame format that is utilized by exemplary embodiments of the present invention to transfer information downstream from the memory controller 802 to the memory modules 806. In an exemplary embodiment of the present invention, the downstream frame consists of eight transfers, with each transfer including twenty-two signals and a differential clock (twenty-four wires total). The frame further consists of eight command wires (c0 through c7) 1208, nine data wires (di0 through di8) 1206, four bus error correction code (ECC) wires (ecc0 through ecc3) 1204 and a spare wire (spare) 1202. The seventy-two data bits are shown in FIG. 12 as bits di0 through di8, and consist of nine wires with eight transfers on each wire for each frame. In exemplary embodiments of the present invention, the frame format depicted in FIG. 12 may be utilized to deliver one or two memory commands plus seventy-two bits of write data per memory clock cycle. The numbering of each data bit, as well as for other bits, is based on the wire used as well as the specific transfer. D34 refers to data bit 3 (of bits 0 through 8) and transfer 4 (of transfer 0 through 7). The command bit field is shown as c0 through c7, and consists of sixty-four bits of information provided to the module over eight transfers.

The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of four bus transfers. The spare bit position may be used to logically replace any of the twenty-one wires, also defined as bitlanes, used to transfer bits in the command, data and ECC fields, should a failure occur in one of the bitlanes that results in exceeding a system-assigned failure threshold limit. The spare wire may be utilized to replace a failing segment between any two directly connected assemblies (i.e., between the memory controller 802 and a memory module 806*a*, or between any two memory modules 806*a-d*), to replace a wire due to events such as a wire failure, a connector failure, a solder interconnect failure, a driver failure and/or a receiver failure. Out of the one hundred and seventy-six possible bit positions, one hundred and sixty-eight are available for the transfer of information to the memory module 806, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module 806. The frame format depicted in FIG. 12 is applicable to incoming signals to a memory module 806, from the direction of the memory controller, as well as the outgoing signals to any downstream memory modules 806.

FIG. 13 depicts an upstream frame format that is utilized by exemplary embodiments of the present invention to transfer information upstream from a memory module 806 to either the memory controller 802 or an upstream memory module 806. In an exemplary embodiment of the present invention, the upstream frame consists of eight transfers, with each transfer including twenty-three signals and a differential clock (twenty-five wires total). The frame further consists of eighteen data wires (do0 through do17) 1306, four bus ECC wires (ecc0 through ecc3) 1304 and a spare wire (spare) 1302. In exemplary embodiments of the present invention, the frame format depicted in FIG. 13 may be utilized to deliver one hundred and forty-four read data bits per memory clock cycle. The numbering of each data bit, as well as for other bits, is based on the wire used as well as the specific transfer. D34 refers to data bit 3 (of bits 0 through 17) and transfer 4 (of transfer 0 through 7).

The ECC bit field (ecc0 through ecc3) consists of thirty-two bit positions over eight transfers, but is actually formatted in groups of sixteen bits. Each sixteen bit packet consists of four transfers over each of the four wires with error correction being performed every four transfers. The spare wire position may be used to logically replace any of the twenty-two wires used to transfer bits in the data and ECC fields, should a failure occur in one of these wires that is consistent in nature. A failure may be considered to be consistent in nature if it exceeds a system dependent threshold value (e.g., number of times the failure is detected). Single bitlane failures may be corrected on the fly by the bus level ECC, while a system service element, such as a service processor, may decide to spare out a failing segment to repair hard (e.g., periodic, repeating and continuous) failures that may occur during system operation. The spare wire may be utilized to replace a failing segment between any two directly connected assemblies (i.e., between the memory controller 802 and a memory module 806a, or between any two memory modules 806a-d), to replace a wire due to any purpose such as wire failure, a connector failure, a solder interconnect failure, a driver failure and/or a receiver failure. Out of the one hundred and eighty-four possible bit positions, one hundred and seventy-six are available for the transfer of information to the memory module 806, and of those one hundred and seventy-six bit positions, thirty-two bit positions are further assigned to providing ECC protection on the bus transfers themselves, thereby allowing a total of one hundred and forty-four bit positions to be used for the transfer of information to an upstream memory module 806 or to the memory controller 802.

Whereas lesser embodiments might include spare bitlanes that are not truly 'spare' or 'unused' (i.e., they have an existing function in the current implementation), these embodiments may compromise the overall memory subsystem data integrity when the 'spare' bitlane is invoked. An example might be a subsystem in which a portion of the bits used for error detection are eliminated through the re-assignment of the wire in which the bits are communicated, resulting in reduced fault detection and a significant (up to or exceeding two hundred times) increase in the probability of undetectable data corruption ('silent data corruption'). This approach is considered unwise for applications that demand high levels of data integrity and system availability.

Figure 14:
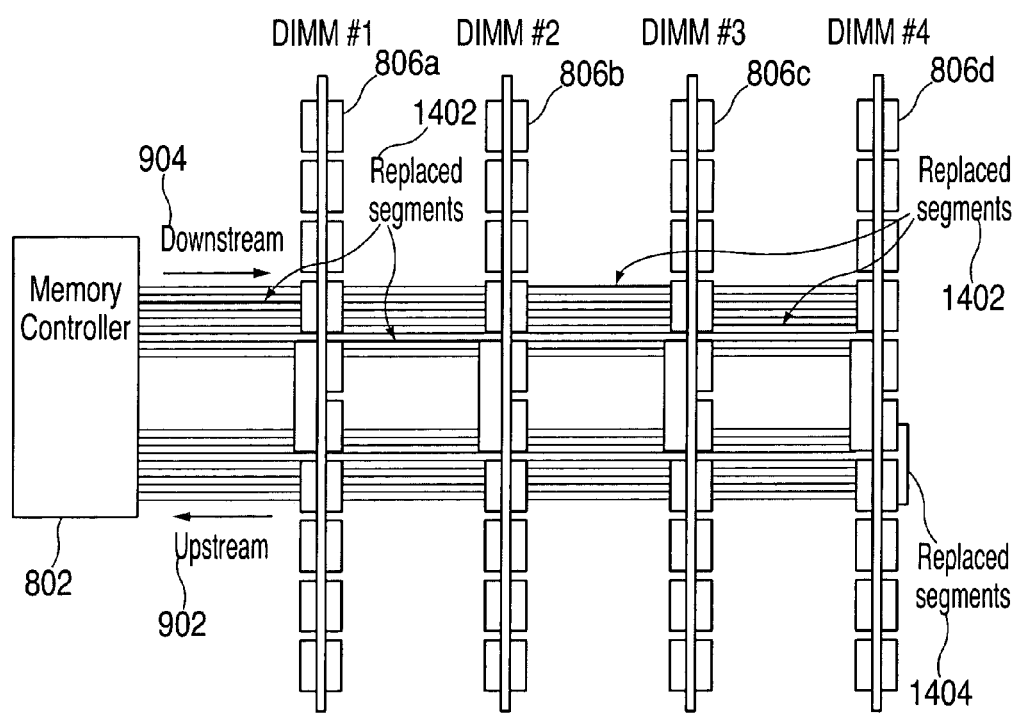
FIG. 14 depicts a cascaded module bus structure with segment sparing the is utilized by exemplary embodiments of the present invention.

Exemplary embodiments of the present invention maximize memory subsystem survivability in the event of more than one failing interconnect between the memory controller 802 and the first memory module 806, as well as between any two interconnected memory modules 806 in the subsystem. FIG. 14 depicts a cascaded module bus structure with segment level sparing that is utilized by exemplary embodiments of the present invention. FIG. 14 includes a simplified drawing of a memory subsystem that includes a memory controller 802, a cascaded downstream memory bus 904, a cascaded upstream memory bus 902, four memory modules 806a-d (with more or less permissible), and a series of replaced segments 1402 that comprise unique wires between every two assemblies on the downstream memory bus 904.

Exemplary embodiments of the present invention provide the ability to assign the spare wire shown in FIGS. 12 and 13, in a unique manner, to enable replacement of any failing segment between any two assemblies (i.e., between the memory controller 802 and a memory module 806a, or between any two memory modules 806a-d) on both the upstream memory bus 902 and the downstream memory bus 904. A different set of failing segments may be assigned to the spare wires on the upstream memory bus 902 and the downstream memory bus 904. This allows the memory system to continue to operate for extended periods, even after the failure of portions of the subsystem. Through the use of bus level ECC (which allows continuous operation of the bus in the presence of bit or wire fails), the availability of a spare bit lane in the downstream (and upstream) frame, and the ability to replace single segments between any two assemblies (while retaining the ability to replace a segment between any two other assemblies on the same cascaded bus), a high level of reliability and survivability may be obtained.

Replacement of a bitlane, from end-to-end (memory controller to last DIMM in cascade chain), offers a more simplistic approach for correcting interconnect failures, but is inefficient because 'spare' bitlanes are very costly, and most fails will be due to a single point or device, rather than to an entire bitlane. In an eight DIMM memory channel, the use of segment level sparing permits up to eight unique faults to be bypassed, via eight independent segment replacements, whereas end-to-end replacement of a full bitlane would allow only a single fault to be bypassed.

An alternate exemplary embodiment of the present includes sparing of the high speed clock if failure information and diagnostics indicate that a portion of the clock is at fault. In general clock faults are already minimized through the use of redundant connector contacts, since the connector contacts are often a large contributor to repeating hard failures in the channel.

Figure 15:
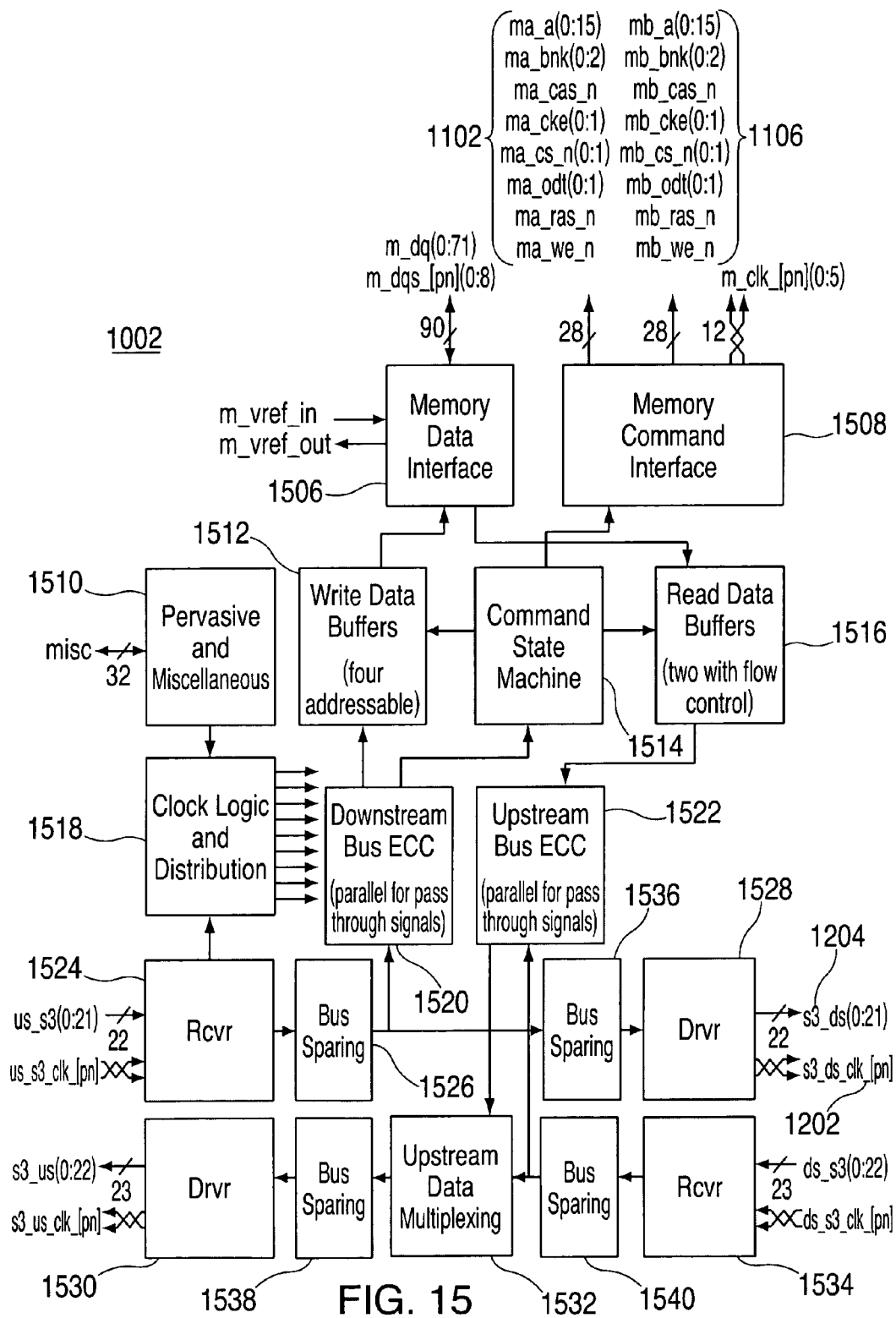
FIG. 15 is a block diagram of a buffer chip high level logic flow as utilized by exemplary embodiments of the present invention.

FIG. 15 is a block diagram of a high level logic flow of a multi-mode buffer device 1002 utilized by exemplary embodiments of the present invention to provide segment level sparing. The multi-mode buffer device 1002 (also referred to as a buffer module) includes four bus sparing logic blocks (1526, 1536, 1538 and 1540) that allow unique sparing to occur for any segment. In addition, the buffer module 1002 includes an upstream bus ECC functional block 1522 and a downstream bus ECC functional block 1520, which operate on any information, or signals, received or passing through the buffer device 1002, to enable determination if a bus error is present. The upstream bus ECC functional block 1522 and downstream bus ECC functional block 1520 perform bus level fault detection and correction, through use of the bus-level error detection and correction codes. This permits the identification of the specific segment that is failing, which may be followed by a segment replacement. The blocks in the lower left and right portions of the drawing (1524, 1528, 1530, 1534) are associated with receiving or driving the high speed bus 804. "Upstream" refers to the bus 902 passing information in the direction of the memory controller 802, and "downstream" refers to the bus 904 passing information away from the memory controller 802.

Referring to FIG. 15, data, command, address, ECC, and clock signals from an upstream memory assembly (i.e., a memory module 806) or a memory controller 802 are received from the downstream memory bus 904 into a receiver module 1524. The receiver function block 1524 provides macros and support logic for the downstream memory bus 904 and, in an exemplary embodiment of the present invention includes support for a twenty-two bit, full speed, slave receiver bus. The receiver function block 1524 transmits the clock signals to a clock logic and distribution functional block 1518 (e.g., to generate the four to one clock signals). The clock logic and distribution functional block 1518 also receives data input from the pervasive and miscellaneous signals 1510. These signals typically include control and setup information for the clock distribution PLL's, test inputs for BIST (built-in self-test) modes, programmable timing settings, etc. The receiver functional block 1524 transfers the data, command, ECC and address signals to a bus sparing logic block 1526 to reposition, when applicable, the bit placement of the data in the event that the spare wire utilized during the transmission from the previous assembly. In an exemplary embodiment of the present invention, the bus sparing logic block 1526 is implemented by a multiplexor to shift the signal positions, if needed. Next, the original or re-ordered signals are input to another bus sparing logic block 1536 to modify, or reorder if necessary, the signal placement to account for any defective interconnect that may exist between the current memory assembly and a downstream memory assembly. The original or re-ordered signals are then input to a driver functional block 1528 for transmission, via the downstream memory bus 904, to the next memory module 806 in the chain. In an exemplary embodiment of the present invention, the bus sparing logic 1536 is implemented using a multiplexor. The driver functional block 1528 provides macros and support logic for the downstream memory bus 904 and, in an exemplary embodiment of the present invention, includes support for the twenty-two bit, high speed, low latency cascade bus drivers.

In addition to inputting the original or re-ordered signals to the bus sparing logic 1536, the bus sparing logic 1526 also inputs the original or re-ordered signals into a downstream bus ECC functional block 1120 to perform error detection and correction for the frame. The downstream bus ECC functional block 1120 operates on any information received or passed through the multi-mode buffer device 1002 from the downstream memory bus 904 to determine if a bus error is present. The downstream bus ECC functional block 1520 analyzes the bus signals to determine if it they are valid. Next, the downstream bus ECC functional block 1520 transfers the corrected signals to a command state machine 1514. The command state machine 1514 inputs the error flags associated with command decodes or conflicts to a pervasive and miscellaneous functional block 1510. The downstream and upstream functional blocks also present error flags and/or error data (if any) to the pervasive and miscellaneous functional block 1510 to enable reporting of these errors to the memory controller, processor, service processor or other error management unit.

Referring to FIG. 15, the pervasive and miscellaneous functional block 1510 transmits error flags and/or error data to the memory controller 802. By collecting error flags and/or error data from each memory module 806 in the chain, the memory controller 802 will be able to identify the failing segment(s), without having to initiate further diagnostics, though additional diagnostics may be completed in some embodiments of the design. In addition, once an installation selected threshold (e.g., one, two, ten, or twenty) for the number of failures or type of failures has been reached, the pervasive and miscellaneous functional block 1510, generally in response to inputs from the memory controller 802, may substitute the spare wire for the segment that is failing. In an exemplary embodiment of the present invention, error detection and correction is performed for every group of four transfers, thereby permitting operations to be decoded and initiated after half of the eight transfers, comprising a frame, are received. The error detection and correction is performed for all signals that pass through the memory module 806 from the downstream memory bus 904, regardless of whether the signals are to be processed by the particular memory module 806. The data bits from the corrected signals are input to the write data buffers 1512 by the downstream bus ECC functional block 1520.

The command state machine 1514 also determines if the corrected signals (including data, command and address signals) are directed to and should be processed by the memory module 806. If the corrected signals are directed to the memory module 806, then the command state machine 1514 determines what actions to take and may initiate DRAM action, write buffer actions, read buffer actions or a combination thereof. The write data buffers 1512 transmit the data signals to a memory data interface 1506 and the command state machine 1514 transmits the associated addresses and command signals to a memory command interface 1508, consistent with the DRAM specification. As described previously, the right side commands 1106 are generally transmitted via the right address command bus 1102 to the right side of the memory module 806 and the left side commands 1102 are transmitted via the left address command bus 1106 to the left side of the memory module 806 although additional module configurations may exist.

Data signals to be transmitted to the controller 802 may be temporarily stored in the read data buffers 1516 after a command, such as a read command, has been executed by the memory module 806, consistent with the memory device 'read' timings. The read data buffers 1516 transfer the read data into an upstream bus ECC module 1522. The upstream bus ECC functional block 1522 generates check bits for the signals in the read data buffers 1516. The check bits and signals from the read data buffers 1516 are input to the upstream data multiplexing functional block 1532. The upstream data multiplexing functional block 1532 merges the data on to the upstream memory bus 902 via the bus sparing logic 1538 and the driver functional block 1530. If needed, the bus sparing logic 1538 may re-direct the signals to account for a defective segment between the current memory module 806 and the upstream receiving module (or memory controller). The driver functional block 1530 transmits the original or re-ordered signals, via the upstream memory bus 902, to the next assembly (i.e., memory module 806 or memory controller 802) in the chain. In an exemplary embodiment of the present invention, the bus sparing logic 1538 is implemented using a multiplexor to shift the signals. The driver functional block 1530 provides macros and support logic for the upstream memory bus 902 and, in an exemplary embodiment of the present invention, includes support for a twenty-three bit, high speed, low latency cascade driver bus.

Data, clock and ECC signals from the upstream memory bus 902 are also received by any upstream multi-mode buffer device 1002 in any upstream memory module 806. These signals need to be passed upstream to the next memory module 806 or to the memory controller 802. Referring to FIG. 15, data, ECC and clock signals from a downstream assembly (i.e., a memory module 806) are received on the upstream memory bus 902 into a receiver module 1534. The receiver functional block 1534 provides macros and support logic for the upstream memory bus 902 and, in an exemplary embodiment of the present invention includes support for a twenty-three bit, high speed, slave receiver bus. The receiver module 1534 passes the data and ECC signals, through the bus sparing module 1540, to the upstream data multiplexing functional block 1532 and then to the bus sparing logic block 1538. The signals are transmitted to the upstream memory bus 902 via the driver functional block 1530.

In addition to passing the data and ECC signals to the upstream data multiplexing functional block 1532, the corrected bus sparing functional block 1540 also inputs the original or re-ordered data and ECC signals to the upstream bus ECC functional block 1522 to perform error detection and correction for the frame. The upstream bus ECC functional block 1522 operates on any information received or passed through the buffer module 1002 from the upstream memory bus 902 to determine if a bus error is present. The upstream bus ECC functional block 1522 analyzes the data and ECC signals to determine if they are valid. Next, the upstream bus ECC functional block 1522 transfers any error flags and/or error data to the pervasive and miscellaneous functional block 1510 for transmission to the memory controller 802. In addition, once a pre-defined threshold for the number or type of failures has been exceeded, the pervasive and miscellaneous functional block 1510, generally in response to direction of the memory controller 802, may substitute the spare segment for a failing segment.

Each memory controller 802 to memory module 806 or memory module 806 to memory module 806 bus may have a unique bitlane segment replaced by the spare signal, as defined in the downstream frame 1202 and upstream from 1302. The block diagram in FIG. 15 is one implementation of a buffer module 1002 that may be utilized by exemplary embodiments of the present invention. Other implementations are possible without departing from the scope of the present invention.

In order to achieve a lower latency in the cascaded memory subsystem, a mechanism designed to expedite the substitution of a spare wire is utilized by exemplary embodiments of the present invention. Rather than using the spare signal to replace any failing segment within the bus, a portion of the bus is shifted by one bit position to initiate the use of the spare signal in a way that avoids the need for a multiplexing function with a large number of selectable inputs. A single two to one selector is used on each bit of the driver and receiver busses. When a spare operation is performed, a register is loaded with the location of the segment to be replaced. This value is priority encoded into the multiplexor selects for each bit. On the sending side (performed by bus sparing logic modules 1536 and 1538), bits that are more significant than the replaced segment are shifted back down into their original location. On the receiving side (performed by bus sparing logic modules 1526 and 1540), bits more significant than the replaced segment are shifted back down to their original location.

Exemplary embodiments of the present invention provide segment level sparing. Through the use of bus level ECC, which allows continuous operation of the bus in the presence of bit or wire fails, the availability of a spare bit lane in the downstream (and upstream) frame, and the ability to replace single segments between any two assemblies while retaining the ability to replace a segment between any two other assemblies on the same cascaded bus will result in increased reliability and survivability of a memory subsystem. By using the bus level ECC, the controller will generally be able to identify failing segments without running diagnostic tools. This will lead to a faster recovery time for failing interconnects in a memory subsystem, as well as increase the probability of accurately identifying failing segments that occur infrequently.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory system, the memory system comprising:
   two or more memory assemblies, each memory assembly comprising one or more buffer devices;
   a memory controller;
   a cascaded interconnect memory bus, the memory controller in communication with the two or more memory assemblies via the cascaded interconnect memory bus, the cascaded interconnect bus including two or more bitlanes for the transfer of information from the memory controller to the two or more memory assemblies and from any one or more of the two or more memory assemblies to the memory controller, the buffer devices on each of the memory assemblies in direct communication with the two or more bitlanes and each bitlane comprised of one or more segments for transferring information between the memory controller and the memory assemblies, with each segment connecting the memory controller to one of the memory assemblies or connecting one of the memory assemblies to an other one of the memory assemblies such that information is transferable from any source to any destination on the cascaded interconnect memory bus and the source is not required to be adjacent to the destination;
   a memory interface bus on each of the buffer devices to enable communication with one or more memory devices; and
   error detection circuitry and segment level sparing circuitry on the memory controller and each buffer device to enable the detection of faults on a segment and to perform segment level sparing to enable any segment to be replaced with another segment through the use of one or more previously unused spare segments within the cascaded interconnect memory bus, thereby maintaining the same number of signal carrying bitlanes and the same level of fault detection within the cascaded interconnect memory bus after the segment level sparing has been performed as were available prior to the segment level sparing being performed, and internal operation of the memory devices and bus operation of the memory interface bus after the segment level sparing has been performed are the same as the internal operation of the memory devices and bus operation of the memory interface bus prior to the segment level sparing being performed.

2. A memory system, the memory system comprising:

two or more memory assemblies, each memory assembly comprising one or more buffer devices;

a memory controller;

a cascaded interconnect memory bus, the memory controller in communication with the two or more memory assemblies via the cascaded interconnect memory bus, the cascaded interconnect bus including:

an upstream bus and a downstream bus each including a forwarded clock, the forwarded clock re-driven between the memory assemblies by the one or more buffer devices; and two or more bitlanes for the transfer of information from the memory controller to the two or more memory assemblies and from any one or more of the two or more memory assemblies to the memory controller, the buffer devices on each of the memory assemblies in direct communication with the two or more bitlanes and each bitlane comprised of one or more segments for transferring information between the memory controller and the memory assemblies, with each segment connecting the memory controller to one of the memory assemblies or connecting one of the memory assemblies to an other one of the memory assemblies such that information is transferable from any source to any destination on the cascaded interconnect memory bus and the source is not required to be adjacent to the destination;

a memory interface bus on each of the buffer devices to enable communication with one or more memory devices; and error detection circuitry and segment level sparing circuitry on the memory controller and each buffer device to enable the detection of faults on a segment and to perform segment level sparing to enable any segment to be replaced with another segment through the use of one or more previously unused spare segments within the cascaded interconnect memory bus, thereby maintaining the same number of signal carrying bitlanes and the same level of fault detection within the cascaded interconnect memory bus after the segment level sparing has been performed as were available prior to the segment level sparing being performed, and internal operation of the memory devices and bus operation of the memory interface bus after the segment level sparing has been performed are the same as the internal operation of the memory devices and bus operation of the memory interface bus prior to the segment level sparing being performed.

3. The memory system of claim 1 wherein the upstream bus includes twenty-three bitlanes, wherein one bitlane is a spare bitlane and four bitlanes are error correction code bitlanes.

4. The memory system of claim 1 wherein the downstream bus includes twenty-two bitlanes, wherein one bitlane is a spare bitlane and four bitlanes are error correction code bitlanes.

5. A memory system, the memory system comprising:

two or more memory assemblies, each memory assembly comprising one or more buffer devices;

a memory controller;

a cascaded interconnect memory bus, the memory controller in communication with the two or more memory assemblies via the cascaded interconnect memory bus, the cascaded interconnect bus including:

an upstream bus and a downstream bus each including one or more single ended signals and a differential forwarded clock, the differential forwarded clock re-driven between the memory assemblies by the one or more buffer devices; and two or more bitlanes for the transfer of information from the memory controller to the two or more memory assemblies and from any one or more of the two or more memory assemblies to the memory controller, the buffer devices on each of the memory assemblies in direct communication with the two or more bitlanes and each bitlane comprised of one or more segments for transferring information between the memory controller and the memory assemblies, with each segment connecting the memory controller to one of the memory assemblies or connecting one of the memory assemblies to an other one of the memory assemblies such that information is transferable from any source to any destination on the cascaded interconnect memory bus and the source is not required to be adjacent to the destination;

a memory interface bus on each of the buffer devices to enable communication with one or more memory devices; and error correction code (ECC) and segment level sparing circuitry on the memory controller and each buffer device to enable the detection and correction of faults on a segment within a bitlane on the fly and to perform segment level sparing to enable any segment to be replaced with another segment through the use of one or more previously unused spare segments within the cascaded interconnect memory bus, thereby maintaining the same number of signal carrying bitlanes and the same level of fault detection within the cascaded interconnect memory bus after the segment level sparing has been performed as were available prior to the segment level sparing being performed, and internal operation of the memory devices and bus operation of the memory interface bus after the segment level sparing has been performed are the same as the internal operation of the memory devices and bus operation of the memory interface bus prior to the segment level sparing being performed.

* * * * *